US012557829B2

(12) United States Patent
Yu

(10) Patent No.: US 12,557,829 B2
(45) Date of Patent: Feb. 24, 2026

(54) LIQUID-PHASE, SUPPLEMENTARY FEED COMPOSITION CONTAINING COENZYME Q10

(71) Applicant: Hyo Gyoung Yu, Gyeonggi-do (KR)

(72) Inventor: Hyo Gyoung Yu, Gyeonggi-do (KR)

( * ) Notice: Subject to any disclaimer, the term of this patent is extended or adjusted under 35 U.S.C. 154(b) by 274 days.

(21) Appl. No.: 18/281,410

(22) PCT Filed: Feb. 9, 2022

(86) PCT No.: PCT/KR2022/001964
§ 371 (c)(1),
(2) Date: Sep. 11, 2023

(87) PCT Pub. No.: WO2022/196943
PCT Pub. Date: Sep. 22, 2022

(65) Prior Publication Data
US 2024/0148026 A1 May 9, 2024

(30) Foreign Application Priority Data
Mar. 17, 2021 (KR) ........................ 10-2021-0034823

(51) Int. Cl.
*A23K 20/105* (2016.01)
*A23K 20/142* (2016.01)
*A23K 20/158* (2016.01)
*A23K 20/163* (2016.01)

(52) U.S. Cl.
CPC .......... *A23K 20/105* (2016.05); *A23K 20/142* (2016.05); *A23K 20/158* (2016.05); *A23K 20/163* (2016.05)

(58) Field of Classification Search
CPC .. A23K 20/163; A23K 20/158; A23K 20/142; A23K 20/105; A23K 20/10

USPC .................. 426/2, 53, 54, 73, 630, 635, 807
See application file for complete search history.

(56) References Cited

U.S. PATENT DOCUMENTS

| 7,803,366 | B2 | 9/2010 | Parkhideh |
| 9,167,839 | B1 | 10/2015 | Bezzek |
| 2009/0004170 | A1* | 1/2009 | Ikehara ................ A61K 9/1623 |
| | | | 424/94.1 |
| 2019/0350997 | A1* | 11/2019 | Tarnopolsky ........ A61K 31/353 |

FOREIGN PATENT DOCUMENTS

| EP | 2172223 | A1 | 4/2010 |
| KR | 10-2017-0119642 | A | 10/2017 |
| WO | WO-02071874 | A2 * | 9/2002 | ................ A61P 9/00 |
| WO | WO-2009001787 | A1 * | 12/2008 | ............. A23K 20/10 |

OTHER PUBLICATIONS

International Search Report from corresponding PCT Application No. PCT/KR2022/001964, Dated Nov. 29, 2022.

* cited by examiner

*Primary Examiner* — Jennifer McNeil
(74) *Attorney, Agent, or Firm* — Harness, Dickey & Pierce, P.L.C.

(57) ABSTRACT

The present invention relates to a liquid-phase, supplementary feed composition containing coenzyme Q10 and, more specifically, to a liquid-phase, supplementary feed composition containing coenzyme $Q_{10}$, conjugated linoleic acid, fructooligosaccharide, L-carnitine, and taurine at specific contents, whereby the composition can prevent aging and onset of cardiovascular diseases and cardiac disease, activate the immune system, and provide a diet effect in companion animals.

7 Claims, 3 Drawing Sheets liquid

I.V.

liquid

Powder

LIQUID-PHASE, SUPPLEMENTARY FEED COMPOSITION CONTAINING COENZYME Q10

CROSS-REFERENCE TO RELATED APPLICATIONS

This application is a national phase application of PCT Application No. PCT/KR2022/001964, filed on Feb. 9, 2022, which claims the benefit and priority to Korean Patent Application No. 10-2021-0034823, filed on Mar. 17, 2021. The entire disclosures of the applications identified in this paragraph are incorporated herein by references.

TECHNICAL FIELD

The present invention relates to a liquid supplementary feed composition containing coenzyme $Q_{10}$, and more specifically, to a liquid supplementary feed composition containing coenzyme $Q_{10}$ that can prevent aging of companion animals, cardiovascular disease and heart disease, activate the immune system, have high absorption rate and bioavailability as a liquid, and provide a diet effect by comprising coenzyme $Q_{10}$, conjugated linoleic acid, fructooligosaccharide, L-carnitine and taurine in specific amounts.

BACKGROUND ART

As interest in companion animals increases, aging of companion animals becomes a problem. The average lifespan of companion dogs in 1980 was 3.7 years, but increased to 14.2 years in 2016, which is believed to be due to better hygiene and improved living conditions. There is also a report by the Japan Animal Food Association that this average lifespan corresponds to 70 to 75 years for humans, and 50% of cats fall within that age.

Due to the aging of companion animals, cases of poor mobility or dementia have increased, and demand for diapers and oral care products for elderly companion animals has increased. In the case of Korea, due to the companion animal adoption boom in the early 2000s, it is gradually entering an aging era.

Aging is related to reactive oxygen species. Oxygen is supplied with one electron in an organelle called mitochondria in the cell, and it is made into a radical called superoxide anion, which is very reactive. There are various kinds of highly reactive oxygen species, such as hydroxyl radical, hydrogen peroxide and nitric oxide, and they are called reactive oxygen species.

The human or animal body tries to maintain a certain amount of active oxygen, but when the amount of active oxygen greatly increases due to various factors, the organism undergoes oxidative stress, leading to cell death, disease and aging of cells. The balance between the production of reactive oxygen species and the antioxidant capacity of cells determines oxidative stress, which damages intracellular proteins, lipids and DNA. It causes many aging-related diseases such as Parkinson's disease, cancer, neurodegenerative diseases, visual impairment such as cataracts and formation of skin spots.

Substances that block these active oxygens are called antioxidants, and can be classified into those naturally present in the human body and those administered from the outside. Antioxidants naturally present in the human body include enzymes such as SOD, glutathione, peroxidase, uric acid, and bilirubin. Externally administered antioxidants include vitamins E and C, and beta-carotene, and among minerals, selenium is representative. In addition, there are flavonoids, polyphenols, propolis and $CoQ_{10}$.

Coenzyme $Q_{10}$ was isolated from bovine heart mitochondria in 1957 by Crane et al. Wolf et al. named the structure of $CoQ_{10}$ as 2,3-dimethoxy-5-methyl-6-decaprenyl-1,4-benzoquinone. It is an antioxidant called $CoQ_{10}$, Ubiquinone or Ubidecarenone, and is a benzoquinone derivative widely seen from bacteria to higher organisms. As a non-protein coenzyme, it activates cellular energy metabolism and removes active oxygen. It is not only present in all cells, but also produced in the body, and is an important substance responsible for 95% of the cell and energy generation pathways.

However, the amount of coenzyme $Q_{10}$, which peaks at the age of 20, decreases significantly with age, and the amount of coenzyme $Q_{10}$ that people in their 20s have decreases by 30% in their 40s and by 70% in their 80s. In addition, in the case of companion animals, the amount of coenzyme $Q_{10}$ produced decreases from the age of three.

In addition, although coenzyme $Q_{10}$ exhibits an excellent antioxidant effect, it is very unstable to external environmental factors, such as light, heat and oxygen. And at the same time, since it is insoluble in water, general organic solvents and oil, so its use is limited.

On the other hand, conjugated linoleic acid (CLA) is a kind of fatty acid formed by changing the chemical structure of linoleic acid, which is a fatty acid. CLA, as its name implies, has a conjugated double bond. CLA has various physiological activities. For example, anticancer activity, antioxidant activity, anti-arteriosclerosis activity, antibacterial activity, etc. have been known so far, and it is known to have preventive and therapeutic effects on various adult diseases. In addition, CLA is gaining a lot of attention as a slimming ingredient because it is known to have a dietary effect on body fat, especially abdominal fat, by directly acting on fat cells in the body, preventing them from absorbing fat, increasing the breakdown and metabolic rate of fat cells, reducing fat cells by increasing apoptosis and helping fat to be used as energy for muscle building.

Therefore, there is still a demand for a supplementary feed that can provide dietary benefits while protecting pets from aging, using ingredients such as the coenzyme $Q_{10}$ and conjugated linoleic acid.

CONTENTS OF THE INVENTION

Problems to be Solved

The purpose of the present invention is to provide a liquid supplementary feed composition containing coenzyme $Q_{10}$ that can prevent aging of companion animals, cardiovascular disease and heart disease, activate the immune system, have high absorption rate and bioavailability as a liquid, and provide a diet effect by comprising coenzyme $Q_{10}$, conjugated linoleic acid, fructooligosaccharide, L-carnitine and taurine in specific amounts.

Technical Means

In order to achieve the technical purpose, the present invention provides a liquid supplementary feed composition containing coenzyme $Q_{10}$ comprising, 0.5 to 40% by weight of coenzyme $Q_{10}$, 0.01 to 35% by weight of conjugated linoleic acid, 1 to 45% by weight of fructooligosaccharide, 0.001 to 15% by weight of L-carnitine, 0.01 to 20% by weight of taurine and the balance of water, based on 100% by weight of the composition.

The present invention is explained in more detail below.

The liquid supplementary feed composition of the present invention comprises coenzyme $Q_{10}$. Coenzyme $Q_{10}$ is a substance with anti-aging and antioxidant effects, which is often found in mitochondria, the energy-producing organelles of cells, and is widely distributed in the human body. It is a powerful antioxidant that protects cells from free radicals and supports the activity of vitamin E, which has antioxidant properties, to prevent skin aging and support cardiovascular function.

The content of coenzyme Q10 in the liquid supplementary feed composition of the present invention may be 0.5% by weight or more, 0.8% by weight or more, 1% by weight or more, 1.5% by weight or more, 2% by weight or more or 2.2% by weight or more, and may be 40% by weight or less, 35% by weight or less, 30% by weight or less, 25% by weight or less, 20% by weight or less, 10% by weight or less, 8% by weight or less or 5% by weight or less—for example, 0.5 to 40% by weight, 1 to 25% by weight, 1.5 to 10% by weight or 2 to 5% by weight, based on 100% by weight of the total composition. If the content of coenzyme $Q_{10}$ is lower than the above values, the antioxidant and anti-aging effects are insignificant. Conversely, if the content of coenzyme $Q_{10}$ is higher than the above values, it is difficult to expect additional effects and coenzyme $Q_{10}$ may not be dissolved well or may be precipitated when exposed for a long time.

The liquid supplementary feed composition of the present invention comprises conjugated linoleic acid. In the present invention, the type of conjugated linoleic acid is not particularly limited, and commercially available conjugated linoleic acid may be used. Examples of such conjugated linoleic acids include Tonaline CLA from Cognis (Germany), Clarinol CLA from Lipid Nutrition (Netherlands) and CLA from HK Biotech (Korea).

The content of conjugated linoleic acid contained in the liquid supplementary feed composition of the present invention may be 0.01% by weight or more, 0.05% by weight or more, 0.1% by weight or more, 0.15% by weight or more, 0.2% by weight or more, 0.25% by weight or more or 0.3% by weight or more, and may be 35% by weight or less, 30% by weight or less, 25% by weight or less, 20% by weight or less, 10% by weight or less, 8% by weight or less or 5% by weight or less—for example, 0.01 to 35% by weight, 0.1 to 25% by weight, 0.15 to 10% by weight or 0.3 to 5% by weight, based on 100% by weight of the total composition. If the content of conjugated linoleic acid is lower than the above value, the physiological activity of conjugated linoleic acid may be weakened. Conversely, if the content of conjugated linoleic acid is higher than the above value, conjugated linoleic acid may not dissolve well or may be precipitated upon exposure for a long time.

The liquid supplementary feed composition of the present invention comprises fructooligosaccharides. Fructooligosaccharide (FOS) helps to proliferate beneficial bacteria and suppress harmful bacteria in the intestine.

The content of fructooligosaccharides contained in the liquid supplementary feed composition of the present invention may be 1%) by weight or more, 1.5% by weight or more, 2% by weight or more, 2.2% by weight or more, 2.5% by weight or more, 2.8% by weight or more or 3% by weight or more, and may be 45% by weight or less, 35% by weight or less, 25% by weight or less, 20% by weight or less, 10% by weight or less, 8% by weight or less or 5% by weight or less—for example, 1 to 45% by weight, 1.5 to 35% by weight, 2 to 10% by weight or 2.5 to 5% by weight, based on 100% by weight of the total composition. If the content of fructooligosaccharide is lower than the above value, the effect of beneficial bacteria growth and harmful bacteria inhibition may be weakened. Conversely, when the content of fructooligosaccharide is higher than the above value, it is difficult to expect additional effects.

The liquid supplementary feed composition of the present invention comprises L-carnitine. L-carnitine decomposes fat to help prevent or treat fatty liver, liver disease, pancreatitis, diabetes, heart and cardiovascular disease and anemia, etc. in companion animals.

The content of L-carnitine contained in the liquid supplementary feed composition of the present invention may be 0.001% by weight or more, 0.003% by weight or more, 0.005% by weight or more, 0.007% by weight or more, 0.009% by weight or more or 0.01% by weight or more, and may be 15% by weight or less, 12% by weight or less, 10% by weight or less, 5% by weight or less, 2% by weight or less, 1% by weight or less or 0.5% by weight or less—for example, 0.001 to 15% by weight, 0.003 to 10% by weight, 0.005 to 2% by weight or 0.009 to 0.5% by weight, based on 100% by weight of the total composition. If the content of L-carnitine is lower than the above value, the effect of preventing or treating fatty liver and liver disease may be weak. Conversely, if the content of L-carnitine is higher than the above value, it is difficult to expect additional effects.

The liquid supplementary feed composition of the present invention comprises taurine. Taurine helps prevent vascular disease.

The content of taurine contained in the liquid supplementary feed composition of the present invention may be 0.01% by weight or more, 0.03% by weight or more, 0.05% by weight or more, 0.07% by weight or more, 0.09% by weight or more or 0.1% by weight or more, and may be 20% by weight or less, 15% by weight or less, 10% by weight or less, 8% by weight or less, 5% by weight or less, 2% by weight or less or 1% by weight or less—for example, 0.01 to 20% by weight, 0.05 to 8% by weight or 0.1 to 5% by weight, based on 100% by weight of the total composition. If the content of taurine is lower than the above value, the effect of preventing vascular diseases may be weakened. Conversely, if the content of taurine is higher than the above value, it is difficult to expect additional effects.

The liquid supplementary feed composition of the present invention may further comprise at least one additive consisting of glycerin, an auxiliary emulsifier, palm oil, a flavoring, an amino acid-based additive, a vitamin-based additive, an extract or combinations thereof.

The supplementary feed composition of the present invention may comprise glycerin to prevent precipitation of conjugated linoleic acid and the like, and to dissolve conjugated linoleic acid with a relatively small amount of emulsifier. In the present invention, glycerin may be comprised in 20 to 80% by weight, more preferably 25 to 78% by weight and more preferably 30 to 75% by weight in the liquid supplementary feed composition. In the present invention, if the content of glycerin is lower than the above value, the storage stability of the supplementary feed composition may be deteriorated. If the content of glycerin is in excess of 40% by weight, there is a problem that the texture or flavor may be lowered when the supplementary feed composition is used in beverages, foods, etc.

The supplementary feed composition of the present invention may comprise an auxiliary emulsifier to more stably emulsify the conjugated linoleic acid. In the present invention, the auxiliary emulsifier may be preferably glycerin fatty acid ester, lecithin, sodium metaphosphate, sorbitan fatty acid ester, sodium stearyl lactate, calcium stearyl lactate, sucrose ester of fatty acid, polyoxyethylene glycerol fatty acid ester, polyoxyethylene sorbitan fatty acid ester, sodium polyphosphate, propylene glycol or combinations thereof, but it is not limited thereto.

In the present invention, the auxiliary emulsifier may be included in 1 to 15% by weight, more preferably 3 to 13% by weight and more preferably 5 to 12% by weight in the supplementary feed composition. In the present invention, if the auxiliary emulsifier is included in less than 1% by weight, emulsion stability may be lowered. If the auxiliary emulsifier is included in excess of 15% by weight, there may be a problem that the viscosity of the supplementary feed composition becomes too high.

The liquid supplementary feed composition of the present invention may comprise palm oil to facilitate mixing of oil-soluble ingredients as vegetable oils and fats to aid emulsification and improve absorption.

The liquid supplementary feed composition of the present invention may comprise a flavoring to enhance the taste of the supplementary food and help companion animals to consume it well.

The liquid supplementary feed composition of the present invention may comprise an amino acid-based additive. Amino acid-based additives may be DL-methionine, DL-methionine hydroxy analogue (MHA), DL-methionine hydroxy analogue calcium salt, DL-alanine, DL-threonine iron, DL-tryptophan, L-glutamic acid, L-lysine, L-lysine hydrochloride, L-lysine sulfate, L-methionine, L-valine, L-cystine, L-arginine, L-isoleucine, L-threonine, L-trypto-phan, L-histidine, L-histidine hydrochloride, L-cysteine hydrochloride, aminoacetic acids, taurine, amino acid mixture, L-leucine or combinations thereof, but is not limited thereto.

The liquid supplementary feed composition of the present invention may comprise a vitamin-based additive. Vitamin-based additives include L-carnitine, niacin (niacin-nicotinic acid), nicotinamide, biotin (vitamin H), vitamin A powder (retinol powder), vitamin A oil (retinol oil), vitamin B1, vitamin B1 naphthalin-1,5-disulfonate (thiamine naphtha-line-1,5-disulfonate), vitamin B1 lauryl sulfate (thiamine lauryl sulfate), vitamin B1 rhodanate (thiamine thiocyanate), vitamin B1 hydrochloride (thiamine hydrochloride), vitamin B1 nitrate (thiamine nitrate), vitamin B2 (riboflavin), vitamin B2 phosphate sodium (riboflavin 5'-phosphate sodium), vitamin B6 hydrochloride (pyridoxine hydrochloride), vitamin B12 (cyanocobalamin), vitamin C (L-ascorbic acid), vitamin C calcium salt (L-ascorbic acid calcium salt), vitamin C-2 magnesium phosphate (L-ascorbic acid-2-phosphate magnesium), L-ascorbic acid-2-polyethylene glycol ether, vitamin C sodium salt (L-ascorbic acid sodium salt), vitamin D powder (calciferol powder), vitamin D2 (calciferol), vitamin D3 (cholecalciferol), vitamin E (DL-alpha-tocopherol), vitamin E acetate (DL-alpha-tocopherol acetate), d-alpha-vitamin E acetate, vitamin K1 (phylloqui-none), vitamin K3 (menadione), vitamin K3 sodium sulfite (menadione sodium sulfite salt), vitamin K3 nicotinamide sulfite (menadione nicotinamide sulfite), vitamin K4 (ac-etomenaphthone), choline chloride, folic acid, inositol, choline bitartrate, pantothenic acid, provitamin A (beta-carotene) or combinations thereof, but is not limited thereto.

The liquid supplementary feed composition of the present invention may include an extract as an additive. As the extract, *Acanthopanax senticosus* extract, licorice extract, marigold extract (including lutein and marigold pigment), raspberry extract, wood vinegar, milk thistle extract, artichoke extract, burdock extract, *yucca* extract, tea extract, sugarcane extract (e.g., natural betaine), chicory extract, arrowroot extract, quillaya extract, taheebo extract, golden root extract, evening primrose oil, grapefruit seed extract, grape seed extract, sunflower seed extract, fenugreek extract, sesame oil extract, grain extract (e.g., glucan, mannan), silkworm extract, crustacean extract (e.g., chitosan, chitin), or combinations thereof may be used, but the extract is not limited thereto.

In the present invention, the sum of the additives such as palm oil, a flavoring, amino acid additives, vitamin additives and extracts may be 0.01 to 20% by weight, more preferably 0.05 to 15% by weight and more preferably 0.1 to 10% by weight, based on 100% by weight of the liquid supplementary feed composition. In the present invention, if the content of the additives is lower than the above numerical value, the effect of the additives may be insignificant. Conversely, if the content of the additives is higher than the above value, it is difficult to expect additional effects.

The liquid supplementary feed composition containing coenzyme $Q_{10}$ of the present invention preferably has a viscosity of 1 to 100 cP (centipoise). The liquid supplementary feed composition containing coenzyme $Q_{10}$ of the present invention has excellent storage stability and does not cause precipitation or layer separation of active ingredients such as coenzyme $Q_{10}$ or conjugated linoleic acid even when stored for a long time at room temperature (25° C.) or high temperature (45° C.). In addition, since the aqueous composition containing conjugated linoleic acid of the present invention is stable in a wide range of pH, it can be used in various formulations. The liquid supplementary feed composition containing coenzyme $Q_{10}$ of the present invention can be applied in various forms depending on the desired purpose, and for this purpose, various additives such as a thickener, a sweetener, an excipient, and a flavoring agent may be further included in addition to the above components.

Effect of the Invention

The liquid supplementary feed composition containing coenzyme $Q_{10}$ of the present invention can prevent cardiovascular diseases and heart diseases, activate the immune system, and provide a dietary effect while preventing aging of companion animals.

CONCRETE MODE FOR CARRYING OUT THE INVENTION

Figure 1:
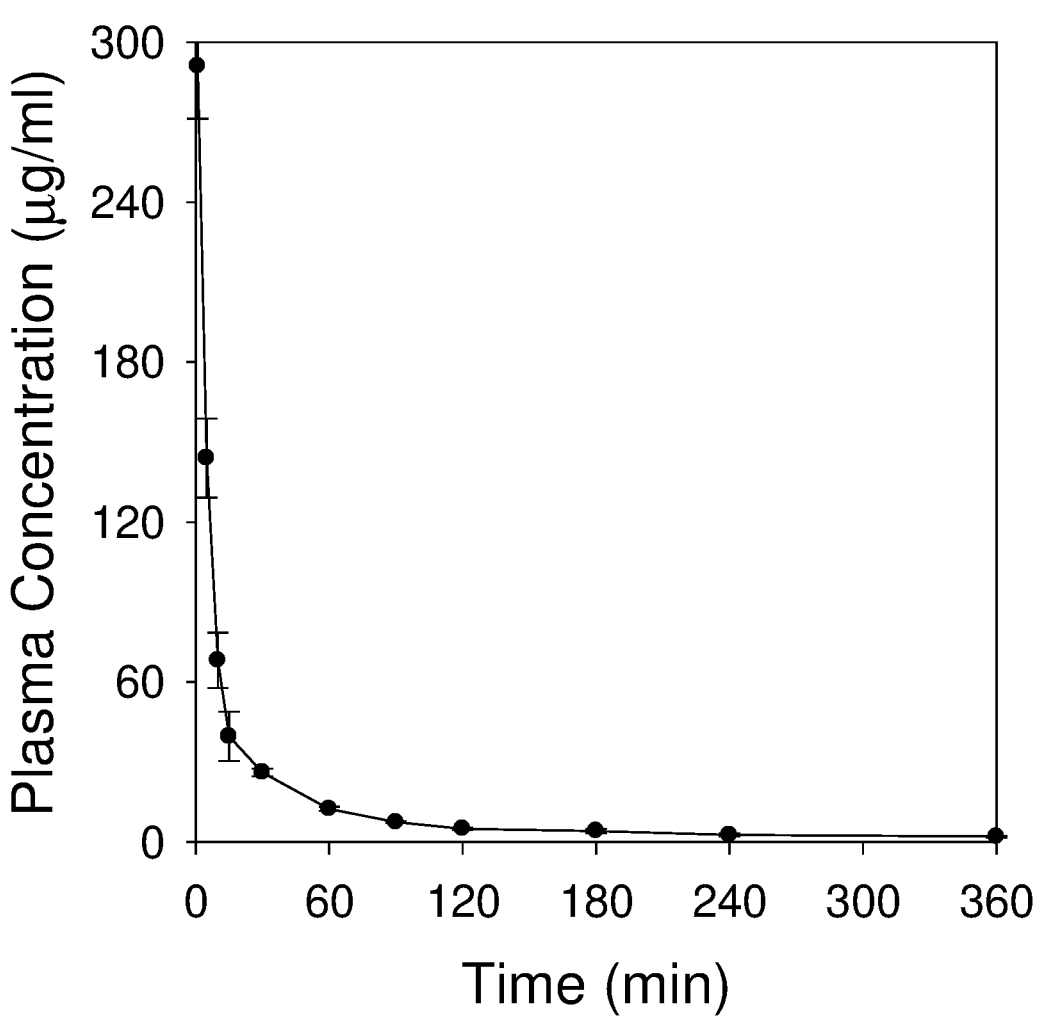
FIG. 1 is a graph showing the plasma concentration after intravenous administration of the liquid supplementary feed composition containing coenzyme $Q_{10}$ of the present invention.

The present invention is explained in more detail through the following Examples and Comparative Examples. However, the scope of the present invention is not limited thereby in any manner.

Example 1

A supplementary feed composition containing coenzyme $Q_{10}$ was prepared by the following method with the composition shown in Table 1 below. First, glycerin fatty acid ester, glycerin and purified water were dissolved by heating to 80° C. Thereafter, coenzyme $Q_{10}$ was put into palm oil and heated until dissolution, and then added to the mixture and emulsified using an emulsifier. Fructooligosaccharide, L-carnitine and taurine were dissolved in purified water and then added after confirming complete dissolution. A flavoring was added and stirred using a stirrer for 30 minutes. After sterilization at 70° C. for 60 minutes, it was stored in a storage container.

TABLE 1

| Component | Content (wt %) |
|---|---|
| Glycerin fatty acid ester | 8 |
| Lecithin | 3 |
| Glycerin | 35 |
| Purified water | 43.99 |
| Coenzyme $Q_{10}$ | 2.4 |
| Conjugated linoleic acid | 0.3 |
| Palm oil | 1 |
| Fructooligosaccharide | 6 |
| Carnitine | 0.01 |
| Taurine | 0.1 |
| Flavoring | 0.2 |
| Total | 100 |

Experimental Example

The supplementary feed composition containing coenzyme $Q_{10}$ was orally administered to rats for 5 consecutive days, and systemic absorption was examined after oral administration on the 5th day. In addition, a single intravenous injection test was performed to evaluate the absorption rate (bioavailability).

Single Intravenous Administration Experiment

Plasma concentration measurement after intravenous coenzyme $Q_{10}$ administration: dose (6 mg/kg), measured up to 6 hours Oral Administration Test on the 5th Day after Continuous Administration for 5 Days (Dose 60 mg/kg)

Plasma concentration measurement after oral administration of aqueous solution (60 mg/kg): measured up to 48 hours Plasma concentration measurement after oral administration of powdered product (60 mg/kg): measured up to 48 hours Plasma Collection after Intravenous Administration After lightly anesthetizing the rats with ether, a polyethylene tube (PE-50, Intramedic, Clay Adams, USA) was intubated into the left femoral artery and vein. After the rats recovered from anesthesia, coenzyme $Q_{10}$ was intravenously administered (6 mg/kg), and blood was collected from the left femoral artery at 0 (blank), 1, 5, 10, 15, 30, 60, 90, 120 and 180 minutes. 250 μl of blood was received in a microtube, and 100 μl of plasma obtained after centrifugation was used for quantification.

Plasma Collection after Oral Administration

After 4 days of oral administration of aqueous solution and powder formulation (60 mg/kg), rats were lightly anesthetized with ether immediately before administration on the 5th day, and a polyethylene tube (PE-50, Intramedic, Clay Adams, USA) was intubated in the left femoral artery. After the rats recovered from anesthesia, the aqueous and powdered formulations were administered orally (60 mg/kg), and blood was collected from the left femoral artery at 0 (blank), 0.5, 1, 1.5, 2, 3, 4, 6, 8, 12, 18, 24 and 48 hours. 250 μl of blood was received in a microtube, and 100 μl of plasma obtained after centrifugation was used for quantification.

Quantification of the Concentration of Coenzyme $Q_{10}$ in Plasma

For coenzyme $Q_{10}$, a calibration curve was prepared in which a good linear relationship (R=0.999) was established in the concentration range of 0.05 μg/mL to 10 μg/mL. For sample processing, 0.1 mL of the collected plasma sample was added with 10 μL of 50 μM coenzyme $Q_9$ as an internal standard (IS), followed by 1 mL of 1-propanol, extracted, vortexed for 20 min to mix thoroughly and centrifuged (12000 rpm, 10 min). All of the supernatant was collected, transferred to another microtube, evaporated with $N_2$ gas, and redissolved in 100 μl of 1-propanol. 100 μL of this was taken and quantified by the HPLC assay described above.

Plasma Concentration Patterns after Intravenous Coenzyme $Q_{10}$ Administration Plasma concentrations of coenzyme $Q_{10}$ after intravenous administration (6 mg/kg) decreased rapidly up to 60 minutes, followed by a gradual decline (see FIG. 1). The half-life ($t_{1/2,\alpha}$) in the pre-distribution phase (α phase) and the half-life ($t_{1/2,\beta}$) in the post-distribution phase (β phase) were 3.3 and 52 minutes, respectively.

Plasma Concentration Pattern after Oral Administration of Coenzyme $Q_{10}$

Figure 2:
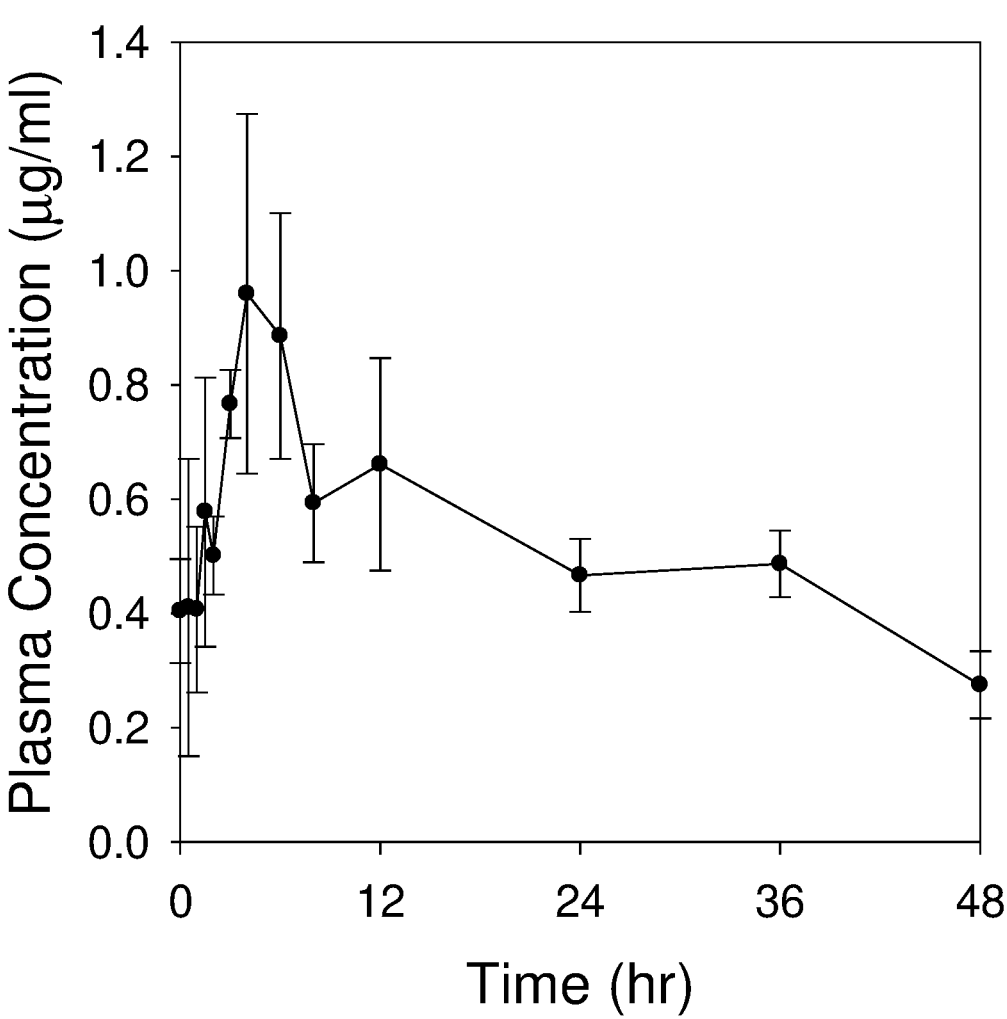
FIG. 2 is a graph showing the plasma concentration after oral administration of the aqueous solution of the liquid supplementary feed composition containing coenzyme $Q_{10}$ of the present invention.
Figure 3:
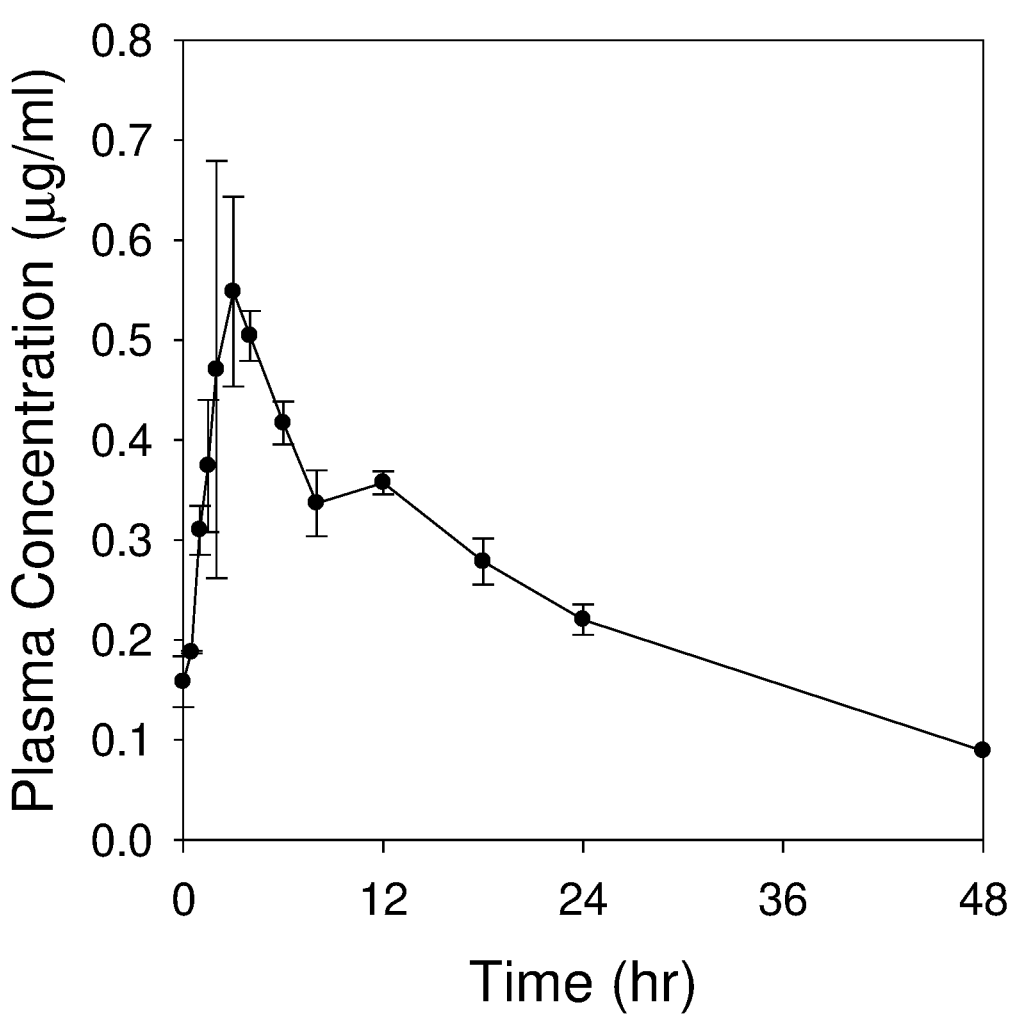
FIG. 3 is a graph showing the plasma concentration after oral administration of the powder formulation of the liquid supplementary feed composition containing coenzyme $Q_{10}$ of the present invention.

Plasma concentration-time patterns after oral administration of aqueous solutions and powder formulations of supplementary feed compositions are shown in FIGS. 2 and 3. After continuous administration for 4 days, blood was collected after administration on the 5th day, and the dose was 60 mg/kg.

The maximum plasma concentration ($C_{max}$) after oral administration of the aqueous solution was about twice as high as that of the powder, and the half-life ($t_{1/2}$) was about twice as large as that of the powder. On the other hand, $T_{max}$ after oral administration of the aqueous solution did not show a significant difference compared to that of the powder.

The bioavailability calculated by correcting the dose from the plasma concentration-area under the curve (AUC) after oral administration of the aqueous solution and powder was low at 4.59% and 1.84%, respectively. This is presumably because coenzyme $Q_{10}$ is very poorly soluble and the absorption rate is not high.

However, as a result of the higher $C_{max}$ and longer biz of the aqueous solution than the powder, the plasma concentration-area under the curve (AUC) was about 2.5 times higher than that of the powder.

In summary of the above results, the aqueous solution was evaluated as a formulation with improved bioavailability (absorption rate) after oral administration compared to the powder formulation.

What is claimed is:

1. A liquid supplementary feed composition containing coenzyme $Q_{10}$ comprising, 0.5 to 2.4% by weight of coenzyme $Q_{10}$, 0.25 to 5% by weight of conjugated linoleic acid, 3 to 8% by weight of fructooligosaccharide, 0.005 to 0.5% by weight of L-carnitine, 0.05 to 1% by weight of taurine and the balance of water, based on 100% by weight of the composition.

2. The liquid supplementary feed composition containing coenzyme $Q_{10}$ according to claim 1, wherein a viscosity is 1 to 100 cP.

3. The liquid supplementary feed composition containing coenzyme $Q_{10}$ according to claim 1, further comprising at least one additive consisting of glycerin, an auxiliary emulsifier, palm oil, a flavoring, an amino acid-based additive, a vitamin-based additive, an extract and combinations thereof.

4. The liquid supplementary feed composition containing coenzyme $Q_{10}$ according to claim 3, wherein the auxiliary emulsifier is one or more selected from the group consisting of glycerin fatty acid ester, lecithin, sodium metaphosphate, sorbitan fatty acid ester, sodium stearyl lactate, calcium stearyl lactate, sucrose ester of fatty acid, polyoxyethylene glycerol fatty acid ester, polyoxyethylene sorbitan fatty acid ester, sodium polyphosphate, propylene glycol or combinations thereof.

5. The liquid supplementary feed composition containing coenzyme $Q_{10}$ according to claim 3, wherein the amino acid-based additive is selected from the group consisting of DL-methionine, DL-methionine hydroxy analogue (MHA), DL-methionine hydroxy analogue calcium salt, DL-alanine, DL-threonine iron, DL-tryptophan, L-glutamic acid, L-lysine, L-lysine hydrochloride, L-lysine sulfate, L-methionine, L-valine, L-cystine, L-arginine, L-isoleucine, L-threonine, L-tryptophan, L-histidine, L-histidine hydrochloride, L-cysteine hydrochloride, aminoacetic acids, amino acid mixture, L-leucine or combinations thereof.

6. The liquid supplementary feed composition containing coenzyme $Q_{10}$ according to claim 3, wherein the vitamin-based additive is selected from the group consisting of niacin, nicotinamide, biotin, vitamin A powder, vitamin A oil, vitamin B1, vitamin B1 naphthalin-1,5-disulfonate, vitamin B1 lauryl sulfate, vitamin B1 rhodanate, vitamin B1 hydrochloride, vitamin B1 nitrate, vitamin B2, vitamin B2 phosphate sodium, vitamin B6 hydrochloride, vitamin B12, vitamin C, vitamin C calcium salt, vitamin C-2-magnesium phosphate, L-ascorbic acid-2-polyethylene glycol ether, vitamin C sodium salt, vitamin D powder, vitamin D2, vitamin D3, vitamin E, vitamin E acetate, d-alpha-vitamin E acetate, vitamin K1, vitamin K3, vitamin K3 sulfite sodium salt, vitamin K3 sulfite nicotinamide, vitamin K4, choline chloride, folic acid, inositol, choline bitartrate, pantothenic acid, provitamin A and combinations thereof.

7. The liquid supplementary feed composition containing coenzyme $Q_{10}$ according to claim 3, wherein the extract is selected from the group consisting of acanthopanax senticosus extract, licorice extract, marigold extract, raspberry extract, wood vinegar, milk thistle extract, artichoke extract, burdock extract, yucca extract, tea extract, sugarcane extract, chicory extract, arrowroot extract, quillaya extract, taheebo extract, golden root extract, evening primrose oil, grapefruit seed extract, grape seed extract, sunflower seed extract, fenugreek extract, sesame oil extract, grain extract, silkworm extract, crustacean extract and combinations thereof.

* * * * *